Figure 1:
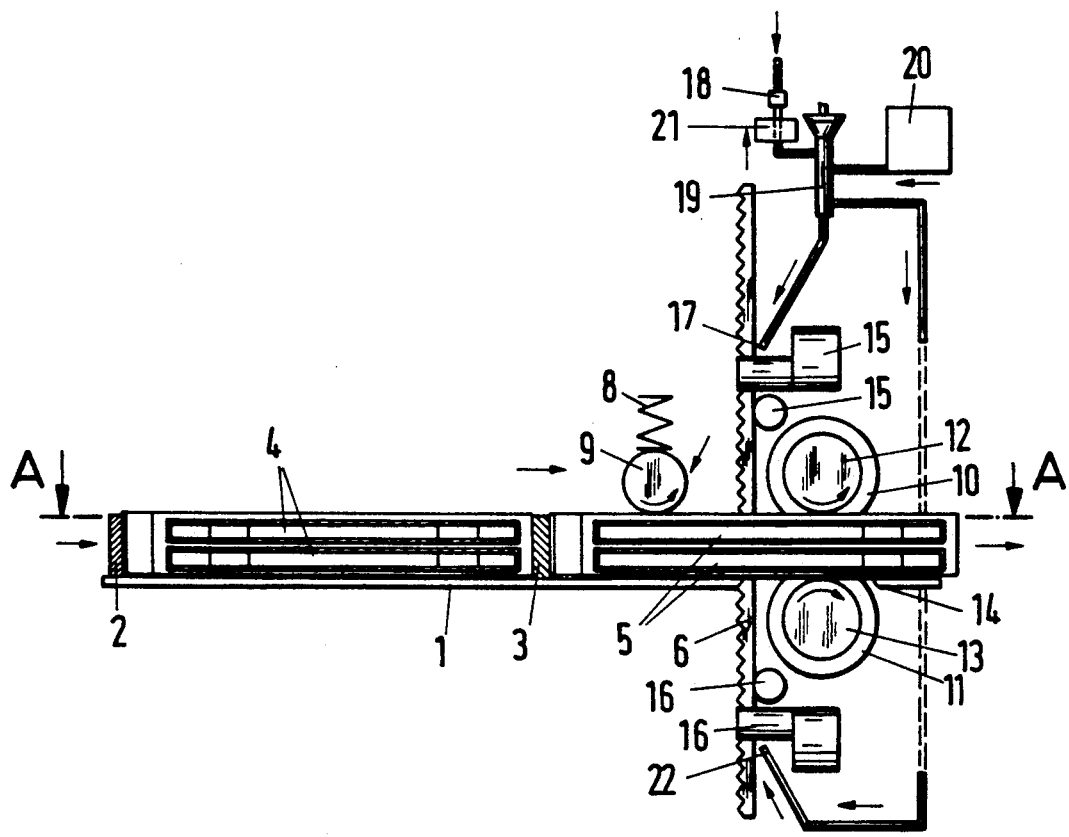

United States Patent [19]

Nienstedt, deceased et al.

[11] Patent Number: 5,286,230

[45] Date of Patent: Feb. 15, 1994

[54] APPARATUS FOR DIVIDING DEEP-FROZEN FOODSTUFFS, WITH RECOVERY OF FOODSTUFFS DETACHED DURING SAID DIVISION

[75] Inventors: Heinz Nienstedt, deceased, late of Haltern; Heinz-Werner Nienstedt, legal representative, Ostfildern, both of Fed. Rep. of Germany

[73] Assignee: Heinz Nienstadt Maschinenfabrik GmbH, Haltern, Fed. Rep. of Germany

[21] Appl. No.: 828,975

[22] PCT Filed: Aug. 4, 1990

[86] PCT No.: PCT/EP90/01280

§ 371 Date: Feb. 3, 1992

§ 102(e) Date: Feb. 3, 1992

[87] PCT Pub. No.: WO91/01645

PCT Pub. Date: Feb. 21, 1991

[30] Foreign Application Priority Data

Aug. 11, 1989 [DE] Fed. Rep. of Germany ....... 3926533

[51] Int. Cl.⁵ .......................... A22C 25/08; B26D 4/44
[52] U.S. Cl. ..................................... 452/170; 452/149; 452/160; 83/714
[58] Field of Search ............... 452/170, 160, 161, 162, 452/149, 155, 157; 83/714

[56] References Cited

U.S. PATENT DOCUMENTS

| Re. 33,851 | 3/1992 | Rudy et al. | 452/161 |
|---|---|---|---|
| 1,812,942 | 7/1931 | Gaines . | |
| 1,870,774 | 8/1932 | Gaines . | |
| 1,872,656 | 8/1932 | Bleam . | |
| 1,908,727 | 5/1933 | Bleam . | |
| 3,588,948 | 6/1971 | Heck | 452/170 |
| 3,832,929 | 9/1974 | Pedi | 83/714 |
| 4,726,094 | 2/1988 | Braeger | 452/157 |
| 4,868,951 | 9/1989 | Akesson et al. | 452/155 |
| 4,967,447 | 11/1990 | Romaine | 452/162 |
| 4,985,965 | 1/1991 | Leavitt | 452/161 |
| 5,061,221 | 10/1991 | Holzhüter et al. | 452/149 |

FOREIGN PATENT DOCUMENTS

| 0155328 | 9/1985 | European Pat. Off. . | |
| 0185292 | 12/1985 | European Pat. Off. . | |
| 1299103 | 7/1969 | Fed. Rep. of Germany . | |
| 3512488 | 7/1986 | Fed. Rep. of Germany . | |
| 3523932 | 1/1987 | Fed. Rep. of Germany | 452/161 |

Primary Examiner—Willis Little
Attorney, Agent, or Firm—Meltzer, Lippe, Goldstein

[57] ABSTRACT

A device for cutting up deep-frozen foodstuffs, in particular fish, has a plurality of saw bands (6) of a band saw arranged side by side at a distance apart, which cut the right parallelepipedal bodies (2, 3) into a plurality of smaller right parallelepipedal units. The fragments produced during cutting are extracted by a current of blast air, which flows around each saw band, onto a pressure roller (9) arranged on top of the right parallelepipedal bodies (2, 3) viewed in the direction of transport before the saw bands (6). The pressure roller (9) spreads the fragments onto the right parallelepipedal bodies (2, 3). After being cut by the saw bands (6), the smaller units undergo no further changes.

5 Claims, 2 Drawing Sheets

APPARATUS FOR DIVIDING DEEP-FROZEN FOODSTUFFS, WITH RECOVERY OF FOODSTUFFS DETACHED DURING SAID DIVISION

The invention relates to an apparatus for dividing deep-frozen foodstuffs, more particularly fish, in the form of parallelipipedic bodies, such as slabs, into a plurality of smaller parallelipipedic units, such as fingers, comprising: a table which forms on its top side a conveying distance for the parallelipipedic bodies, over which the parallelipipedic bodies can be slid by conveying means; a plurality of spaced-out saw elements disposed one beside the other; hold-down elements engaging with the top side of the parallelipipedic bodies and/or smaller units; and an applicator unit, equipped with blowing nozzles for detached foodstuffs.

Deep-frozen foodstuffs can be divided into smaller units only by sawing. Inevitably there is a considerable accumulation of detached material, depending on the thickness of the sawing elements. Although the cutting loss due to the detached material cannot be avoided, to keep such losses low as possible in a prior art apparatus of the kind specified (DE 3512488 C2) the saw elements, taking the form of circular saw blades, are disposed above the table top and enclosed by a suspended hood equipped with blowing nozzles to apply intercepted detached material on to the smaller parallelipipedic units. Interception and application are boosted by a contact pressure roller bearing against the smaller units. One disadvantage of that manner of recovering a proportion of the detached foodstuff is that due to the reapplied detached material the small parallelipipedic units again become caked together at their parting lines and the appearance of the surface of the units is not optimum.

It is an object of the invention to provide an apparatus of the kind specified which ensures that after the separation of the parallelipipedic bodies into smaller units they do not again become caked together at the separating lines and also that the appearance of the surface of the smaller parallelipipedic units remains practically unspoilt by applying detached foodstuffs.

This problem is solved according to the invention by the feature that the saw elements are constructed in the form of saw belts which run upwards from the table and are disposed in the blowing air flow of the blowing nozzles, which is directed upstream of the saw belts in the conveying direction on to the conveying distance of the table situated thereabove.

The use of saw belts in conjunction with the blowing air stream and the place of application upstream of the cut ensures minimum cutting loss and at the same time an optimum appearance of the other parallelipipedic units. The smaller units cannot cake together again, since after cutting no detached foodstuff is applied which may get into the zone of the parting lines. The cuts therefore remain clean even at the parting lines.

The fact that the detached material is applied to the parallelipipedic deep-frozen bodies at a place where it has not yet been locally heated by the cutting ensures that said material is caked back uniformly over the whole surface by the cold content of the bodies.

According to one feature of the invention upstream of the saw belts in the conveying direction a contact pressure roller is provided which bears against the top side of the parallelipipedic bodies. The contact pressure roller can be so positioned that in known manner it presses and smooths the detached foodstuffs on to the surface of the as yet undivided bodies. The contact pressure roller operates particularly effectively if it is heated. Its effect can be further enhanced if the blowing air stream is directed at the contact pressure roller, so that the detached material does not pass directly on to the parallelipipedic bodies, but only via the contact pressure roller. If the roller is heated, the detached material is further softened up and can then be even more satisfactorily applied. This effect can also be achieved or boosted by the blown air itself being heated.

According to another feature of the invention, in the conveying direction of the parallelipipedic bodies spacer discs which enter the separating lines between the smaller units, are disposed downstream of the saw belt and aligned therewith, while driven conveying rollers bearing against the top side of the smaller units are disposed between the spacer discs. The spacer discs and conveying rollers also ensure that the units are guided precisely spaced-apart.

Figure 2:
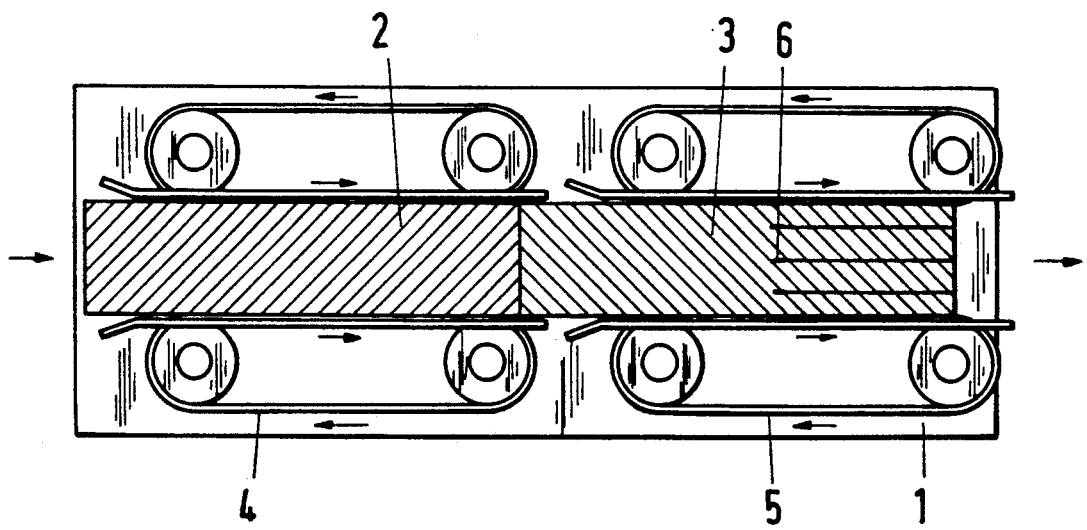

The invention will now be described in greater detail with reference to an embodiment thereof illustrated in the drawings, wherein:

FIG. 1 is a side elevation of an apparatus for dividing deep-frozen foodstuffs, and FIG. 2 is a section, taken along the line A—A in FIG. 1 through the apparatus illustrated in FIG. 1.

Parallelipipedic bodies 2, 3 born on a table 1 are advanced by a combined centring and conveying device in the direction of a belt saw comprising a plurality of saw belts 6 disposed spaced-out from one another. The centring and conveying device has two successive pairs of driving means comprising belts 4, 5 which run over deflecting and driving rollers and which bear against the sides of the bodies 2, 3, so that the belts not only convey, but also laterally align the bodies 2, 3.

Disposed upstream of the saw belts 6 in the conveying direction is a contact pressure roller 9 which bears against a spring 8 and which has a continuous smooth generated surface and bears against the top side of the body 3 supplied to the saw belts 6. Disposed in the conveying direction downstream of the saw belts and above and below the conveying table 1 respectively are a set of driven spacer discs 10, 11 and conveying rollers 12, 13 of smaller diameter. For the lower spacer discs 11 and the conveying rollers 13 and the belt saw the table 1 is formed with a recess 14, so that the spacer discs 10, 11 can enter the parting lines between the smaller units and the conveying rollers 12, 13 can clamp the smaller units between themselves. The contact pressure roller 9 and the conveying roller 12 also act as hold-down means for the blocks 3/smaller units.

The saw belts 6 are driven in the upward direction by driving means which are not shown. Associated with each saw belt 6 above and below the table 1 are guide means 15, 16 which bear the belt 6 on the rear side and guide the belt laterally. In addition, associated with each saw belt 6 above and below the table 1 is a blowing nozzle 17, 22 in whose blowing medium stream the saw belt 6 is disposed. The blowing medium stream of the blowing nozzle 17 is directed at the side of the surface of the contact pressure roller 9 adjacent the saw belts 6, so that detached foodstuff adhering to the saw belt 6 is entrained by the blowing medium stream and applied to the contact pressure roller 9, which applies and smooths the material on to the surface of the body 3. However, the guide means 15, 16 are also disposed in the blowing medium stream of the nozzle 17 and the further nozzle 22, so that the guide means are kept free from detached foodstuff.

A blowing medium source (not shown) supplies blowing medium via a control valve 18 and a mixing pressure tank 19. Aromatic substances from a tank 20 can be admixed with the blowing medium in the mixing pressure tank 19. Preferably the supplied blowing medium is heated. If it does not arrive from the blowing medium source already heated, it can be heated by a continuous heater 21. Due to its heating, the detached foodstuff can be more readily removed by the blowing medium from the saw belts of the belt saw 6 and is at the same time converted to a consistency more suitable for application. This is boosted if the contact pressure roller 9 by which the detached foodstuff is applied to the top side of the body 3 is also heated. In addition, the heated contact pressure roller 9 produces a smoothing effect.

The particular advantages of the invention are that when the bodies 3 have been parted, the smaller units cannot be further treated, so that their appearance is not spoilt. Since the attached foodstuff is applied to the still undivided body 3 prior to cutting, more particularly using heat, the detached foodstuff can be applied uniformly and very smoothly. Since the distribution of cold at this place is uniform, the appearance is also uniform.

One particularly significant feature is that in this way the recovery of detached foodstuff is considerably increased in comparison with the prior art methods. Moreover, in comparison with the use of circular saw blades, the use of saw belts enables higher parallelipipedic bodies to be processed, without the necessity of increasing the thickness of the saw belts. The saw belts also withstand heavier lateral loading in comparison with circular saw blades. In connection with the known centring device, which enables the guiding of the saw belts to be coupled, a certain lateral course is even desirable for the precise guiding of the cutting in the bodies.

What is claimed is:

1. Apparatus for dividing deep-frozen foodstuffs in the form of parallelipipedic bodies into a plurality of smaller parallelipipedic units, comprising
   a table having an upper surface on which said parallelipipedic bodies are disposed,
   conveying means for conveying said parallelipipedic bodies along said upper surface of said table in a conveying direction,
   hold down elements engaging against said foodstuffs to hold them down against said upper surface of said table,
   a plurality of spaced apart saw belts disposed one beside another and oriented for cutting said parallelipipedic bodies into said smaller parallelipipedic units as said saw belts move in an upward direction relative to said table, and
   an applicator unit located above said table, said applicator unit including blowing nozzles out of which a flow of air is directed downwardly toward said saw belts and onto a top surface of said parallelipipedic bodies upstream of said conveying direction, so that pieces of foodstuff detached from said parallelipipedic bodies during the cutting process are lifted upwardly by said saw belts and are blown backward toward the top surface of said parallelipipedic bodies by said flow of air,
   wherein said hold down elements include a contact pressure roller located upstream of said saw belts which bears against the top surface of said parallelipipedic bodies.

2. The apparatus of claim 1 wherein said contact pressure roller is heated.

3. The apparatus of claim 1 wherein said flow of air is directed towards said contact pressure roller.

4. The apparatus of claim 1 wherein said flow of air is heated.

5. The apparatus of claim 1 further comprising spacer discs disposed downstream of said saw belts in the conveying direction, said spacer discs being aligned with said saw belts and entering parting lines formed by said saw belts in said parallelipipedic bodies, and driven conveying rollers which bear against said smaller parallelipipedic units between said spacer discs.

* * * * *